(12) United States Patent
Sasai et al.

(10) Patent No.: US 6,626,588 B1
(45) Date of Patent: Sep. 30, 2003

(54) OPTICAL TRANSMISSION APPARATUS

(75) Inventors: Hiroyuki Sasai, Katano (JP); Tsuyoshi Ikushima, Moriguchi (JP); Masaru Fuse, Toyonaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/503,030

(22) Filed: Feb. 14, 2000

(30) Foreign Application Priority Data

Feb. 15, 1999 (JP) .......................................... 11-036232

(51) Int. Cl.[7] .......................... H04B 10/08; H04B 17/00
(52) U.S. Cl. ........................... 398/32; 398/79; 398/147; 398/192
(58) Field of Search ................................. 359/110, 115, 359/173, 180, 124; 398/31–32, 43, 79, 81, 147, 192

(56) References Cited

U.S. PATENT DOCUMENTS 5,161,044 A * 11/1992 Nazarathy et al. .......... 359/157
5,436,751 A * 7/1995 Ohya et al. .................... 398/76
5,828,477 A   10/1998 Nilsson et al. ............... 359/181
5,841,563 A * 11/1998 Effenberger ................. 359/158
6,031,648 A *  2/2000 Javitt et al. .................. 359/161

* cited by examiner

*Primary Examiner*—Kinfe-Michael Negash
(74) *Attorney, Agent, or Firm*—Wenderoth, Lind & Ponack, L.L.P.

(57) ABSTRACT

An optical transmission apparatus capable of suppressing SBS by multiplexing an input signal with a pilot signal, and further capable of eliminating an adverse effect of intermodulation distortion between the input signal and the pilot signal is provided. When the input signal is a frequency-multiplexed signal obtained by multiplexing a plurality of signals aligned on a frequency axis at regular intervals $\Delta f$ ($\Delta f > 0$), a pilot signal generation part generates the pilot signal having a frequency $\{m-(1/2)\} \times \Delta f$ (m is an arbitrary natural number). A multiplex part multiplexes the input signal (electrical signal to be transmitted) with the pilot signal generated by the pilot signal generation part. An electrical-optical conversion part converts an electric signal outputted from the multiplex part into an optical signal through direct intensity modulation.

22 Claims, 7 Drawing Sheets

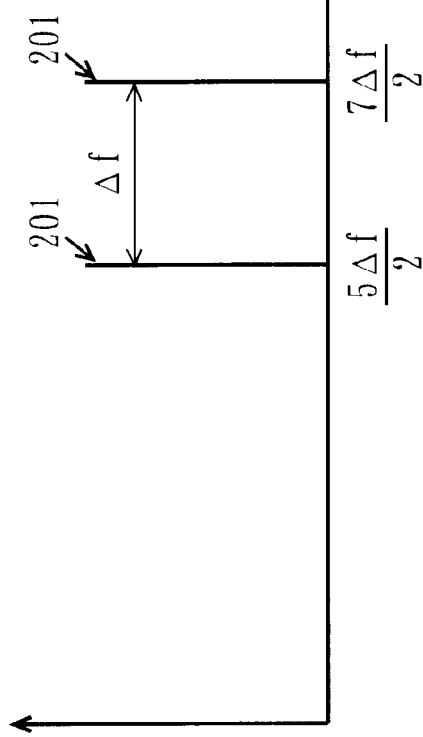
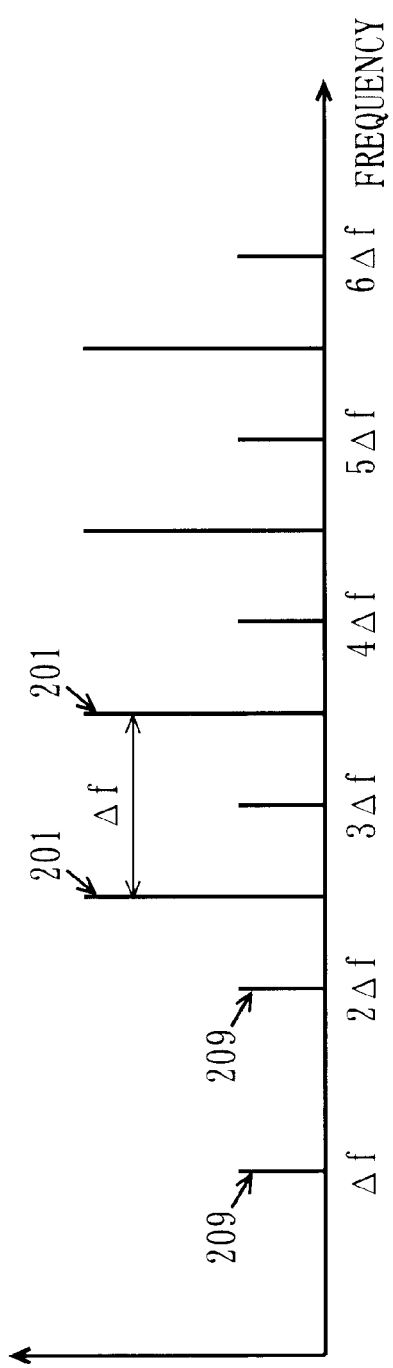
FIG. 5A
FIG. 5B

OPTICAL TRANSMISSION APPARATUS

BACKGROUND OF THE INVENTION

1. Field of the Invention

The present invention relates to optical transmission apparatuses and, more specifically, to an optical transmission apparatus capable of efficiently transmitting an optical signal of large power with better transmission characteristics through an optical fiber by suppressing stimulated Brillouin scattering (SBS).

2. Description of the Background Art

As known, in optical fiber transmission, when an optical signal with large optical power of 10-odd dBm is supplied to an optical fiber, part of the optical signal is reflected due to stimulated Brillouin scattering (SBS) within the optical fiber, and as a result, optical power of an output optical signal is decreased.

A conventional optical transmission apparatus capable of transmitting an optical signal of large power with better transmission characteristics through an optical fiber is disclosed in "Optical Communications System" of Japanese Patent Laying-Open No. 9-69814 (1997-69814).

FIG. 9 is a block diagram showing the configuration of the conventional optical transmission apparatus disclosed in the above publication.

In FIG. 9, the conventional optical transmission apparatus includes a pilot signal generation part 100, an electro-optic conversion part 101, an optical fiber 102, and an opto-electric conversion part 103.

The pilot signal generation part 100 generates a pilot signal. The electro-optic conversion part 101 converts an input signal (electric signal to be transmitted) and the pilot signal into an optical signal through direct intensity modulation. The optical fiber 102 guides the optical signal. The opto-electric conversion part 103 converts the optical signal into an electric signal.

Described below is the operation of the conventional optical transmission apparatus.

First, the electro-optic conversion part 101 is supplied with an input signal and a pilot signal, and converts these signals into an optical signal. The optical signal outputted from the electro-optic conversion part 101 goes through the optical fiber 102 to the opto-electric conversion part 103. The opto-electric conversion part 103 re-converts the received optical signal into an electric signal.

In the above operation, when electro-optic conversion is performed through direct intensity modulation, the optical signal obtained by conversion is not only intensity-modulated but also frequency-modulated (chirping). Multiplexing the input signal with a pilot signal having a frequency lower than that of the input signal causes the spectrum of the optical signal to spread over a wide band due to frequency modulation, thereby resulting in reduction in power of a main mode (maximum optical carrier component). SBS does not occur when the power of the main mode becomes less than a predetermined threshold.

The conventional optical transmission apparatus thus suppresses SBS by multiplexing the input signal with the pilot signal.

Furthermore, in the above publication, multiplexing the input signal with the pilot signal poses two problems: deterioration of transmission characteristics, and occurrence of intermodulation distortion between the input signal and the pilot signal. To solve the former problem, according to the publication, it is preferable to set the optical modulation index of the pilot signal to an appropriate value for suppressing SBS. To solve the latter, it is preferable to set the frequency of the pilot signal less than half of a Brillouin gain band.

However, in the former problem, the appropriate value for suppressing SBS is not necessarily clear and, therefore, a good transmission characteristic can not be ensured.

Furthermore, in the latter, the intermodulation distortion is not sufficiently eliminated only by setting the frequency of the pilot signal less than half of the Brillouin gain band.

SUMMARY OF THE INVENTION

Therefore, an object of the present invention is to provide an optical transmission apparatus capable of suppressing SBS by multiplexing an input signal with a pilot signal and further eliminating an adverse effect of intermodulation distortion between the input signal and the pilot signal, thereby allowing efficient transmission of an optical signal of large power with better transmission characteristics through an optical fiber.

The present invention has the following features to solve the problems above.

A first aspect of the present invention is directed to an optical transmission apparatus transmitting an optical signal through an optical fiber. The apparatus in accordance with the first aspect of the present invention comprises a pilot signal generation part for venerating a pilot signal. a multiplex part for multiplexing an input signal (electric signal to be transmitted) with the pilot signal, an electro-optic converter for converting an electric signal outputted from the multiplex part into an optical signal through direct intensity modulation, the optical fiber for guiding, the optical signal outputted from the electro-optic conversion part, and an opto-electric conversion part for converting the optical signal guided by the optical fiber into an electric signal. When the input signal is a frequency-multiplexed signal obtained by multiplexing a plurality of signals aligned on a frequency axis at regular intervals $\Delta f$ ($\Delta f > 0$), the pilot signal generation part venerates the pilot signal having a frequency $\{m-(1/2)\} \times \Delta f$ (m is an arbitrary natural number).

In the first aspect, intermodulation distortion (second order distortion) between each signal included in the input signal and the pilot signal occurs exactly at the center between two consecutive signals on the frequency axis. Therefore, of the intermodulation distortion between the input signal and the pilot signal, second order distortion, which deteriorates transmission characteristics most, can easily be cut off by a filter. It is thus possible to suppress SBS by multiplexing the input signal with the pilot signal, and also to effectively eliminate an adverse effect of the intermodulation distortion between the input signal and the pilot signal. Consequently, an optical signal of large power can be efficiently transmitted with better transmission characteristics through the optical fiber.

According to a second aspect, further to the first aspect, a frequency of each signal included in the input signal is set to $\{n-(1/2)+C\} \times \Delta f$ ($n=1, 2, 3, \ldots$ and C is 0 or an arbitrary positive integer).

In the second aspect, the intermodulation distortion (second order distortion) between the signals included in the input signal occurs exactly at the center between two consecutive signals. Therefore, such second order distortion can also be cut off when the intermodulation distortion (second order distortion) between the input signal and the pilot signal, which occurs also exactly at the center between two consecutive signals, is cut off by the filter.

A third aspect of the present invention is directed to an optical transmission apparatus transmitting an optical signal through an optical fiber. The apparatus in accordance with the third aspect of the present invention comprises a pilot signal generation part for generating a pilot signal, a level adjusting part for adjusting a level of the pilot signal, a multiplex part for multiplexing an input signal (electric signal to be transmitted) with the pilot signal level-adjusted by the level adjusting part, an electro-optic conversion part for converting an electric signal outputted from the multiplex part into an optical signal through direct intensity modulation, the optical fiber for guiding the optical signal outputted from the electro-optic conversion part, an opto-electric conversion part for converting the optical signal guided by the optical fiber into an electric signal, a reflected light monitoring part for monitoring reflected light caused by stimulated Brillouin scattering (SBS) in the optical fiber, and an optical coupler for supplying the reflected light propagating through the optical fiber in a reverse direction to the optical signal to the reflected light monitoring part. Further, the level adjusting part adjusts the level of the pilot signal to a minimum value for suppressing the SBS based on monitoring results of the reflected light monitoring part. Still further, when the input signal is a frequency-multiplexed signal obtained by multiplexing a plurality of signals aligned on a frequency axis at regular intervals $\Delta f(\Delta f>0)$. the pilot signal generation part generates the pilot signal having a frequency $\{m-(1/2)\}\times\Delta f$ (m is an arbitrary natural number).

In the third aspect, intermodulation distortion (second order distortion) between each signal included in the input signal and the pilot signal occurs exactly at the center between two consecutive signals on the frequency axis. Therefore, of the intermodulation distortion between the input signal and the pilot signal, second order distortion, which deteriorates transmission characteristics most, can easily be cut off by a filter. It is thus possible to suppress SBS by multiplexing the input signal with the pilot signal, and also to effectively eliminate an adverse effect of the intermodulation distortion between the input signal and the pilot signal. Consequently, an optical signal of large power can be efficiently transmitted with better transmission characteristics through the optical fiber. Furthermore, adjusting the level of the pilot signal to an appropriate value, and more specifically, to a minimum value for suppressing SBS, brings far better transmission characteristics.

According to a fourth aspect, further to the third aspect, the reflected light monitoring part monitors the reflected light by measuring intensity thereof.

A fifth aspect of the present invention is directed to an optical transmission apparatus transmitting an optical signal through an optical fiber. The apparatus in accordance with the fifth aspect of the present invention comprises a pilot signal generation part for generating a pilot signal, an electro-optic conversion part for converting the pilot signal into an optical signal through direct intensity modulation, an external optical modulation part for intensity-modulating the optical signal outputted from the electro-optic conversion part with an input signal (electric signal to be transmitted), the optical fiber for guiding the optical signal outputted from the external optical modulation part, and an opto-electric conversion part for converting the optical signal guided by the optical fiber into an electric signal. When the input signal is a frequency-multiplexed signal obtained by multiplexing a plurality of signals aligned on a frequency axis at regular intervals $\Delta f$ ($\Delta f>0$), the pilot signal generation part generates the pilot signal having a frequency $\{m-(1/2)\}\times\Delta f$ (m is an arbitrary natural number).

In the fifth aspect, intermodulation distortion (second order distortion) between each signal included in the input signal and the pilot signal occurs exactly at the center between two consecutive signals on the frequency axis. Therefore, of the intermodulation distortion between the input signal and the pilot signal, second order distortion, which deteriorates transmission characteristics most, can easily be cut off by a filter. It is thus possible to suppress SBS by multiplexing the input signal with the pilot signal, and also to effectively eliminate an adverse effect of the intermodulation distortion between the input signal and the pilot signal. Consequently, the optical signal of large power can be efficiently transmitted with better transmission characteristics through the optical fiber.

A sixth aspect of the present invention is directed to an optical transmission apparatus transmitting an optical signal. The apparatus in accordance with the sixth aspect of the present invention comprises a pilot signal generation part for generating a pilot signals a multiplex part for multiplexing an input signal (electric signal to be transmitted) with the pilot signal, and an electro-optic conversion part for converting an electric signal outputted from the multiplex part into an optical signal through direct intensity modulation. When the input signal is a frequency-multiplexed signal obtained by multiplexing a plurality of signals aligned on a frequency axis at regular intervals $\Delta f(\Delta f>0)$, the pilot signal generation part generates the pilot signal having a frequency $\{m-(1/2)\}\times\Delta f$ (m is an arbitrary natural number).

According to a seventh aspect, further to the sixth aspect, a frequency of each signal included in the input signal is set to $\{n-(1/2)+C\}\times\Delta f$ (n=1, 2, 3, and C is 0 or an arbitrary positive integer).

An eighth aspect of the present invention is directed to an optical transmission apparatus transmitting an optical signal through an optical fiber. The apparatus in accordance with the eighth aspect of the present invention comprises a pilot signal generating part for generating a pilot signal, a level adjusting part for adjusting, a level of the pilot signal, a multiplex part for multiplexing an input signal (electric signal to be transmitted) with the pilot signal level-adjusted by the level adjusting part, an electro-optic conversion part for converting an electric signal outputted from the multiplex part into an optical signal through direct intensity modulation. a reflected light monitoring part for monitoring reflected light caused by stimulated Brillouin scattering (SBS) in the optical fiber. and an optical coupler for supplying the reflected light propagating through the optical fiber in a reverse direction to the optical signal to the reflected light monitoring part. The level adjusting part adjusts the level of the pilot signal to a minimum value for suppressing the SBS based on monitoring results of the reflected light monitoring part. Further. when the input signal is a frequency-multiplexed signal obtained by multiplexing a plurality of signals aligned on a frequency axis at regular intervals $\Delta f$ ($\Delta f>0$). the pilot signal generation part generates the pilot signal having a frequency $\{m-(1/2)\}\times\Delta f$ (m is an arbitrary natural number).

According to a ninth aspect, further to the eighth aspect, the optical transmission apparatus further comprises an optical coupler for supplying the reflected light propagating through the optical fiber in a reverse direction to the optical signal to the reflected light monitoring part.

A tenth aspect of the present invention is directed to an optical transmission apparatus transmitting an optical signal.

The apparatus in accordance with the tenth aspect of the present invention comprises a pilot signal generation part for generating a pilot signal, an electro-optic conversion part for converting the pilot signal into an optical signal through direct intensity modulation, and an external optical modulation part for intensity-modulating the optical signal outputted from the electro-optic conversion part with an input signal (electric signal to be transmitted). When the input signal is a frequency-multiplexed signal obtained by multiplexing a plurality of signals aligned on a frequency axis at regular intervals $\Delta f$ ($\Delta f>0$) the pilot signal generation part generates the pilot signal having a frequency $\{m-(1/2)\}\times\Delta f$ (m is an arbitrary natural number).

These and other objects, features, aspects and advantages of the present invention will become more apparent from the following detailed description of the present invention when taken in conjunction with the accompanying drawings.

BRIEF DESCRIPTION OF THE DRAWINGS

FIGS. 5A and 5B are diagrams illustrating how the optical transmission apparatus according to the second embodiment eliminates an adverse effect of intermodulation distortion (second order distortion) between signals included in the input signal;

DESCRIPTION OF THE PREFERRED EMBODIMENTS

First Embodiment

Figure 1:
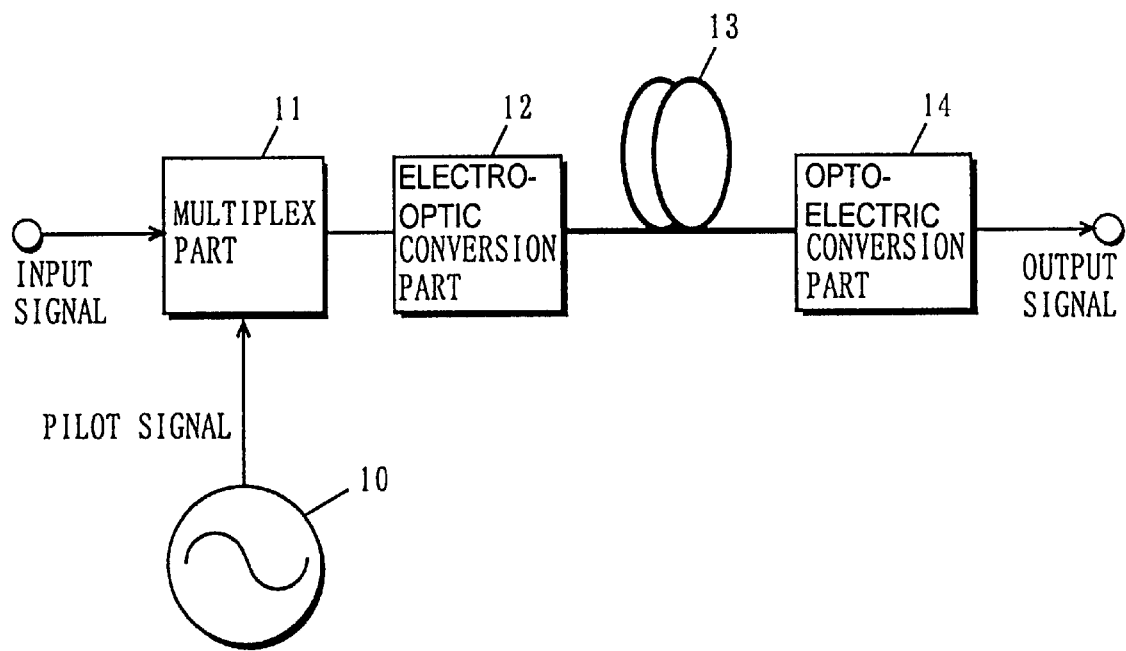
FIG. 1 is a block diagram showing the configuration of an optical transmission apparatus according to first and second embodiments of the present invention.

FIG. 1 is a block diagram showing the configuration of an optical transmission apparatus according to a first embodiment of the present invention. In FIG. 1, the optical transmission apparatus includes a pilot signal generation part 10, a multiplex part 11, an electro-optic conversion part 12, an optical fiber 13, and an opto-electric conversion part 14.

The pilot signal generation part 10 generates a pilot signal. The multiplex part 11 multiplexes an input signal (electric signal to be transmitted) with the pilot signal. The electro-optic conversion part 12 converts an electric signal outputted from the multiplex part 11 into an optical signal through direct intensity modulation. The optical fiber 13 guides the optical signal. The opto-electric conversion part 14 converts the optical signal into an electric signal.

Note that, in FIG. 1, an optical amplifying part for amplifying the optical signal may be provided on a transmission path anywhere between the electro-optic conversion part 12 and the opto-electric conversion part 14 (immediately after the electro-optic conversion part 12, for example).

The operation of the present optical transmission apparatus is now described.

First, the pilot signal generation part 10 generates a pilot signal having a predetermined frequency which will be described later. Then, the pilot signal and an input signal are fed to the multiplex part 11, and multiplexed therein. Here, the input signal is a frequency-multiplexed signal obtained by multiplexing a plurality of signals whose frequencies are aligned on a frequency axis at regular intervals.

An electric signal outputted from the multiplex part 11 is fed to the electro-optic conversion part 12. The electro-optic conversion part 12 converts the received electric signal into an optical signal. The optical signal from the electro-optic conversion part 12 propagates through the optical fiber 13 to the opto-electric conversion part 14. The opto-electric conversion part 14 re-converts the received optical signal into an electric signal.

In the above operation, the optical signal obtained by electro-optic conversion through direct intensity modulation is not only intensity-modulated but also frequency-modulated (chirping). Multiplexing the input signal with the pilot signal having a frequency lower than that of the input signal causes the spectrum of the optical signal to spread over a wide band due to frequency modulation, thereby resulting in reduction in power of the main mode.

The optical transmission apparatus thus suppresses SBS by multiplexing the input signal with the pilot signal.

On the other hand, such multiplexing causes intermodulation distortion between the input signal and the pilot signal. Of the intermodulation distortion, the present optical transmission apparatus eliminates an adverse effect of second order distortion, which deteriorates transmission characteristics most, by setting the frequency of the pilot signal to a specific value.

Described below is the frequency of the pilot signal generated by the pilot signal generation part 10.

Figure 2:
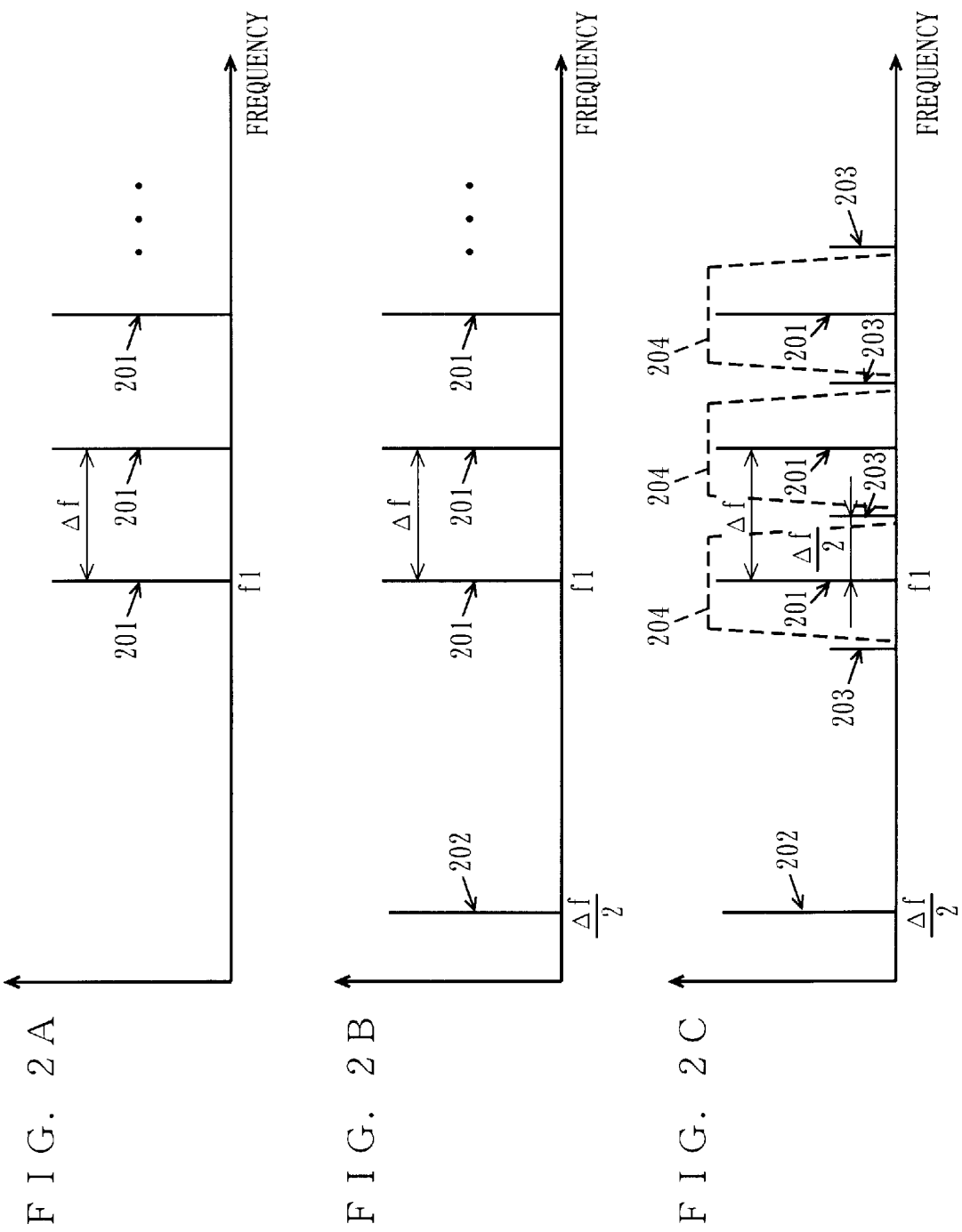
FIGS. 2A to 2C are diagrams illustrating how the optical transmission apparatus according to the present invention (first to fourth embodiments) eliminates an adverse effect of intermodulation distortion (second order distortion) between each signal included in an input signal and a pilot signal.

FIGS. 2A to 2C are diagrams illustrating how the present optical transmission apparatus eliminates an adverse effect of intermodulation distortion (second order distortion) between each signal included in the input signal and the pilot signal.

In FIG. 2A, a spectrum of the input signal (frequency-multiplexed signal) is shown. In FIG. 2A, the input signal includes a plurality of signals 201 aligned on the frequency axis at regular intervals $\Delta f$ ($\Delta f>0$; 6 MHz, for example). That is, the frequencies of the signals 201 included in the input signal are $f1, f1+\Delta f, f1+2\times\Delta f, f1+3\times\Delta f, \ldots$, where $f1>0$. That is, the frequency fn of the signal 201 can be represented by $fn=f1+(n-1)\times\Delta f$ ($n=1, 2, 3, \ldots$).

In FIG. 2B, a spectrum of the electric signal from the multiplex part 11 is shown. The electric signal is the one obtained by multiplexing the input signal with a pilot signal 202. In FIG. 2B, the frequencies of the signals 201 included in the input signal are the same as those shown in FIG. 2A, while the frequency of the pilot signal 202 is $(1/2)\times\Delta f$.

In FIG. 2C, a spectrum of the electric signal from the optical-electrical conversion part 14 is shown. In FIG. 2C, the electric signal includes the plurality of signals 201 included in the input signal as shown in FIG. 2B, the pilot signal 202, and further intermodulation distortion (second order distortion) 203 between each signal 201 and the pilot signal 202.

The intermodulation distortion (second order distortion) between each signal 201 included in the input signal and the pilot signal 202 is now described. A frequency fd of the intermodulation distortion (second order distortion) between two signals are given by $$fd = fn \pm (1/2) \times \Delta f \quad (1),$$

where the frequencies of each signal 201 and the pilot signal 202 are fn and $(1/2) \times \Delta f$, respectively.

In FIG. 2C, a region 204 surrounded by a dotted line represents a band-pass frequency region of a filter (not shown) for filtering a desired signal 201 from the input signal including a plurality of signals 201. Since the frequency of the pilot signal 202 is set to $(1/2) \times \Delta f$, each second order distortion 203 occurs exactly at the center between two consecutive signals 201 on the frequency axis.

Note that the above equation (1) can easily prove such occurrence of each second order distortion when the frequency of the pilot signal 202 is $(1/2) \times \Delta f$.

With such occurrence, the second order distortion 203 can be easily cut off by the filter, compared with a case where the second order distortion occurs at a position shifted from the center.

The occurrence of second order distortion exactly at the center between two consecutive signals 201 on the frequency axis is also observed when the frequency of the pilot signal 202 is $(3/2) \times \Delta f$, $(5/2) \times \Delta f$, ....

In view of the above, in the present optical transmission apparatus, when the input signal is a frequency-multiplexed signal obtained by multiplexing the plurality of signals 201 aligned on the frequency axis at regular intervals $\Delta f$ ($\Delta f > 0$) (between two consecutive signals 201), the frequency of the pilot signal generated by the pilot signal generation part 10 is set to $\{m - (1/2)\} \times \Delta f$ (m is an arbitrary natural number).

This setting causes the intermodulation distortion (second order distortion) 203 between each signal 201 included in the input signal and the pilot signal 202 exactly at the center between two consecutive signals 201 on the frequency axis.

In the above description, each signal 201 included in the input signal has only a carrier component (that is, represented as a single straight line on the frequency axis; refer to FIG. 2A). Each signal 201, however, may have a modulation component in addition to the carrier component.

Figure 3:
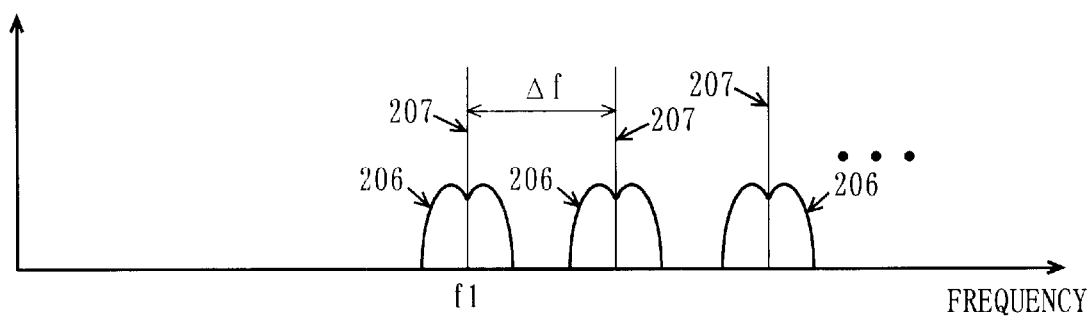
FIG. 3 is a diagram showing a spectrum of an input signal having a modulation component in addition to a carrier component.

In general, a modulation component 206 is spread symmetrically on both sides of a carrier component 207 on the frequency axis (refer to FIG. 3).

Figure 4:
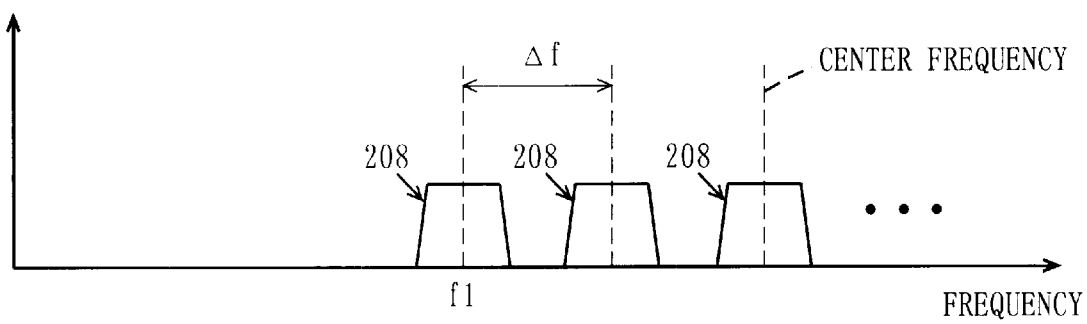
FIG. 4 is a diagram showing a spectrum of an input signal having only a modulation component without a carrier component.

Alternatively, like digital modulation signals such as those in PSK, FSK, and QAM, each signal may have a modulation component 208 without a carrier component, the modulation component 208 spreading over a predetermined width (refer to FIG. 4).

That is, when each frequency of the signal 201 has a predetermined width, the center frequency thereof can be considered as the frequency of the signal 201. With the frequency of the pilot signal 202 set as described above, the intermodulation distortion (second order distortion) 203 between each signal 201 included in the input signal and the pilot signal 202 occurs exactly at the center between two consecutive signals 201 on the frequency axis. In this case, part of distortion components overlapped with the signal component, and the center frequency of distortion having largest spectrum power density is located exactly at the center between two consecutive signals 201. Since a guard band is provided between signals in general, it is possible to efficiently eliminate an adverse effect of distortion.

In the above description, the input signal is a frequency-multiplexed signal whose frequency intervals between two consecutive signals included therein are constant. Alternatively, a signal obtained by frequency-multiplexing a plurality of such frequency-multiplexed signals may be used as the input signal.

As described above, in the optical transmission apparatus according to the first embodiment, the intermodulation distortion (second order distortion) between each signal included in an input signal and the pilot signal occurs exactly at the center between two consecutive signals on the frequency axis. It is thus easy to cut of f the second order distortion, which deteriorates transmission characteristics most among the intermodulation distortion, by a filter. Therefore, the present apparatus can suppress SBS by multiplexing the input signal with the pilot signal, and also can effectively eliminate an adverse effect of such intermodulation distortion. Consequently, an optical signal of large power can be efficiently transmitted with better transmission characteristics through the optical fiber 13.

Second Embodiment

The configuration of an optical transmission apparatus according to a second embodiment of the present invention is similar to that according to the first embodiment shown in FIG. 1. Each part operates similarly to that of the first embodiment.

The second embodiment is different from the first one only in the frequencies of the signals included in the input signal (frequency-multiplexed signal). Therefore, only the difference is described below in detail.

In the first embodiment, the frequencies of the signals included in the input signal are f1, f1+$\Delta f$, f1+2×$\Delta f$, f1+3×$\Delta f$, ..., where f1>0.

On the other hand, in the second embodiment, these frequencies are f1, f1+$\Delta f$, f1+2×$\Delta f$, f1+3×$\Delta f$, ..., where f1 is set to $\{(1/2)+C\} \times \Delta f$ (C is 0 or an arbitrary positive integer). That is, the frequency of each signal included in the input signal is $\{n-(1/2)+C\} \times \Delta f$ (n=1, 2, 3, ..., and C is 0 or an arbitrary positive integer).

The optical transmission apparatus according to the second embodiment sets the frequencies of the signals included in the input signal in the above described manner, eliminating not only intermodulation distortion between each signal included in the input signal and the pilot signal, but also an adverse effect of intermodulation distortion (second order distortion) between the signals included in the input signal.

FIGS. 5A and 5B are diagrams illustrating how the present optical transmission apparatus eliminates an adverse effect of the intermodulation distortion (second order distortion) between the signals included in the input signal.

In FIG. 5A, a spectrum of the input signal (frequency-multiplexed signal) is shown. In FIG. 5A, the input signal includes the plurality of signals 201 aligned on the frequency axis at regular intervals $\Delta f$ ($\Delta f > 0$; 6 MHz, for example) with a minimum value thereof taken as $(5/2) \times \Delta f$. That is, the frequencies of the signals 201 included in the input signal are $(5/2) \times \Delta f$, $(7/2) \times \Delta f$, $(9/2) \times \Delta f$ ....

FIG. 5B shows intermodulation distortion (second order distortion) 209 between the signals 201 included in the input signal in the spectrum of the input signal shown in FIG. 5A. In FIG. 5B, with the frequencies of the signals 201 set as described above, the intermodulation distortion (second order distortion) 209 occurs exactly at the center between two consecutive signals 201 on the frequency axis.

The intermodulation distortion (second order distortion) between two consecutive signals 201 is now described. When the frequencies of the two signals are fn and fn', respectively, (fn>fn'>0), the frequency of fd of intermodulation distortion (second order distortion) between these two signals 201 is represented by $$fd\{n-(1/2)+C\}\times\Delta f\pm\{n'-(1/2)+C\}\times\Delta f$$
$$=(n+n'-1+2\times C)\times\Delta f, (n-n')\times\Delta f \qquad (2)$$

Note that the above equation (2) can easily prove such occurrence of each second order distortion 209 when the frequencies of the signals 201 are $(5/2)\times\Delta f$, $(7/2)\times\Delta f$, $(9/2)\times\Delta f$ . . . .

With such occurrence, the present optical transmission apparatus can also cut off the second order distortion 209 when cutting off the intermodulation distortion between each signal 201 included in the input signal and the pilot signal 202 (the second order distortion 203 shown in FIG. 2C, which also occurs exactly at the center between two consecutive signals 201), by a filter.

Third Embodiment

Figure 6:
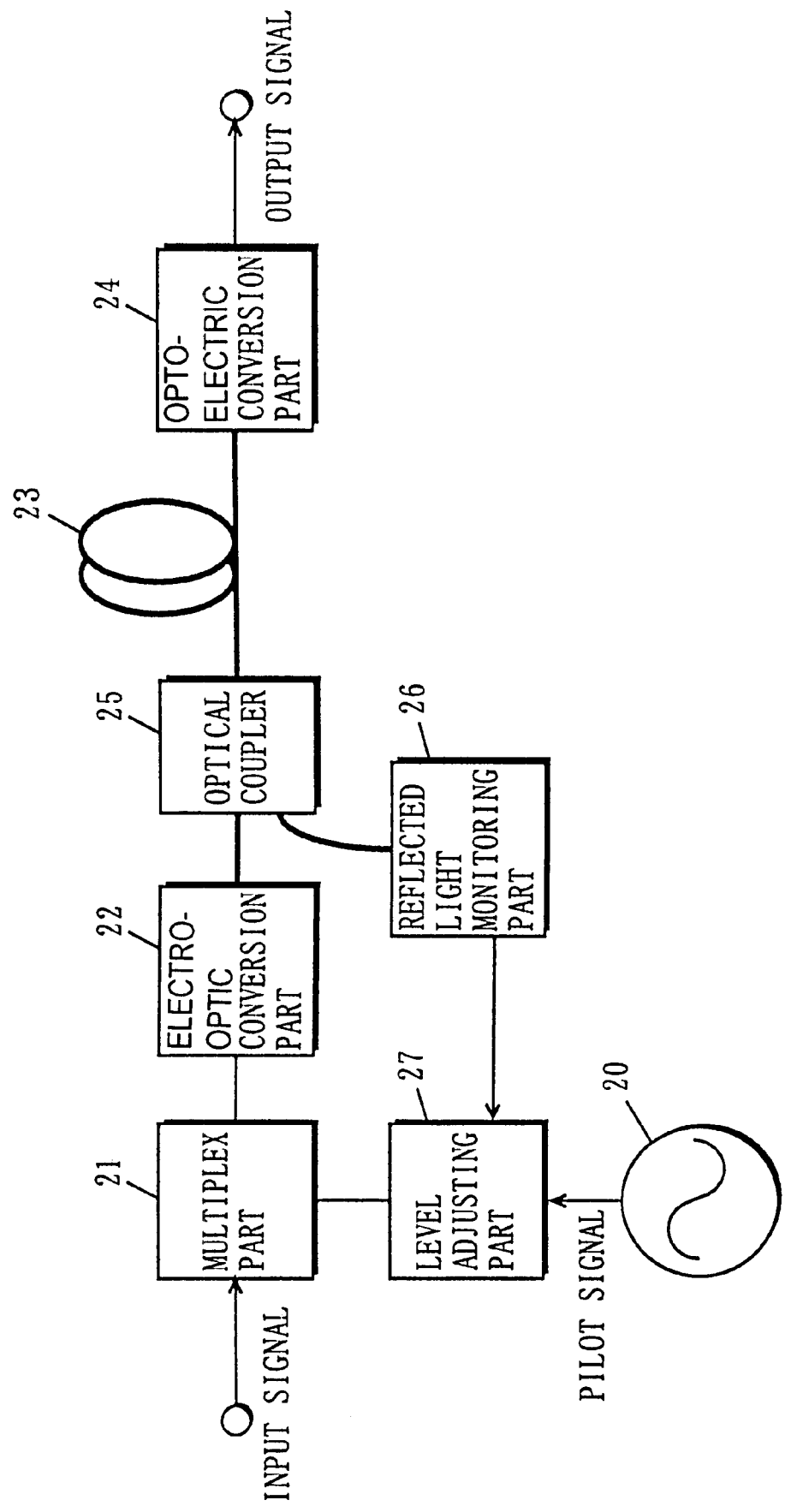
FIG. 6 is a block diagram showing the configuration of an optical transmission apparatus according to the third embodiment of the present invention.

FIG. 6 is a block diagram showing the configuration of an optical transmission apparatus according to a third embodiment of the present invention. In FIG. 6, the present optical transmission apparatus includes a pilot signal generation part 20, a multiplex part 21, an electro-optic conversion part 22, an optical fiber 23, an opto-electric conversion part 24, an optical coupler 25, a reflected light monitoring part 26, and a level adjusting part 27.

The pilot signal generation part 20 generates a pilot signal. The multiplex part 21 multiplexes an input signal (an electric signal to be transmitted) with the pilot signal. The electro-optic conversion part 22 converts an electric signal outputted from the multiplex part 21 into an optical signal through direct intensity modulation. The optical fiber 23 guides the optical signal The opto-electric conversion part 24 converts the optical signal into an electric signal. The optical coupler 25 supplies reflected light to the reflected light monitoring part 26. The reflected light monitoring part 26 monitors the reflected light (more specifically, measures the intensity of the reflected light). The level adjusting part 27 adjusts the level of the pilot signal according to monitoring results (more specifically, the intensity of the reflected light) from the reflected light monitoring part 26.

Note that, in FIG. 6, an optical amplifying part for amplifying the optical signal may be provided on a transmission path anywhere between the electro-optic conversion part 22 and the opto-electric conversion part 24 (immediately after the electro-optic conversion part 22, for example).

The operation of the present optical transmission apparatus is now described.

First, the pilot signal generation part 20 generates a pilot signal having a predetermined frequency which will be described later. Then, the pilot signal is fed to the level adjusting part 27, and the level thereof is adjusted therein (described later). The input signal and the pilot signal are fed to the multiplex part 21, and multiplexed therein. Here, the input signal is a frequency-multiplexed signal obtained by multiplexing a plurality of signals whose frequencies are aligned on a frequency axis at regular intervals.

An electric signal from the multiplex part 21 is fed to the electrical-optical conversion part 22. The electro-optic conversion part 22 converts the received electric signal into an optical signal. The optical signal from the electro-optic conversion part 22 passes through the optical coupler 25, and then propagates through the optical fiber 23 to the opto-electric conversion part 24. The opto-electric conversion part 24 re-converts the received optical signal into an electric signal.

Propagation of the optical signal from the electrical-optical conversion part 22 through the optical fiber 23 causes reflected light in the optical fiber 23 due to SBS. The reflected light propagates through the optical fiber 23 in a reverse direction to the optical signal, and reaches the optical coupler 25. The optical coupler 25 supplies the reflected light to the reflected light monitoring part 26. The reflected light monitoring part 26 monitors the reflected light by measuring the intensity thereof. According to the monitoring results (the measured intensity of the reflected light) of the reflected light monitoring part 26, the level adjusting part 27 adjusts the level of the pilot signal to an appropriate value for suppressing SBS. Note that, as the level of the pilot signal varies, the optical modulation index thereof varies accordingly. Therefore, it can be said that the level adjusting part 27 adjusts the optical modulation index of the pilot signal to an appropriate value for suppressing SBS.

In the above operation, the optical signal obtained by electro-optic conversion through direct intensity modulation is not only intensity-modulated but also frequency-modulated (chirping). Multiplexing the input signal with the pilot signal having a frequency lower than that of the input signal causes the spectrum of the optical signal to spread over a wide band due to frequency modulation,thereby resulting in reduction in power of the main mode.

The present transmission apparatus thus suppresses SBS by multiplexing the input signal with the pilot signal.

On the other hand, such multiplexing causes intermodulation distortion between the input signal and the pilot signal. Of the intermodulation distortion, the present optical transmission apparatus further eliminates an adverse effect of second order distortion, which deteriorates transmission characteristics most, by setting the frequency of the pilot signal to a specific value.

The frequency of the pilot signal generated by the pilot signal generation part 20 is the same as that of the first embodiment. That is, with reference to FIGS. 2A to 2C, when the input signal is a frequency-multiplexed signal obtained by multiplexing the plurality of signals 201 aligned on the frequency axis at regular intervals $\Delta f$ ($\Delta f>0$)(between two consecutive signals 201), the frequency of the pilot signal generated by the pilot signal generation part 20 is set to $\{m-(1/2)\}\times\Delta f$ (m is an arbitrary natural number).

This setting causes the intermodulation distortion (second order distortion) between each signal 201 included in the input signal and the pilot signal exactly at the center between the two consecutive signals 201 on the frequency axis.

The present optical transmission apparatus sets the frequency of the pilot signal in the above described manner, and also sets the optical modulation index thereof to an appropriate value for suppressing SBS (such value as to sufficiently reduce the intensity of the reflected light).

Described below is the relation between the optical modulation index of the pilot signal and the intensity of the reflected light.

Figure 7:
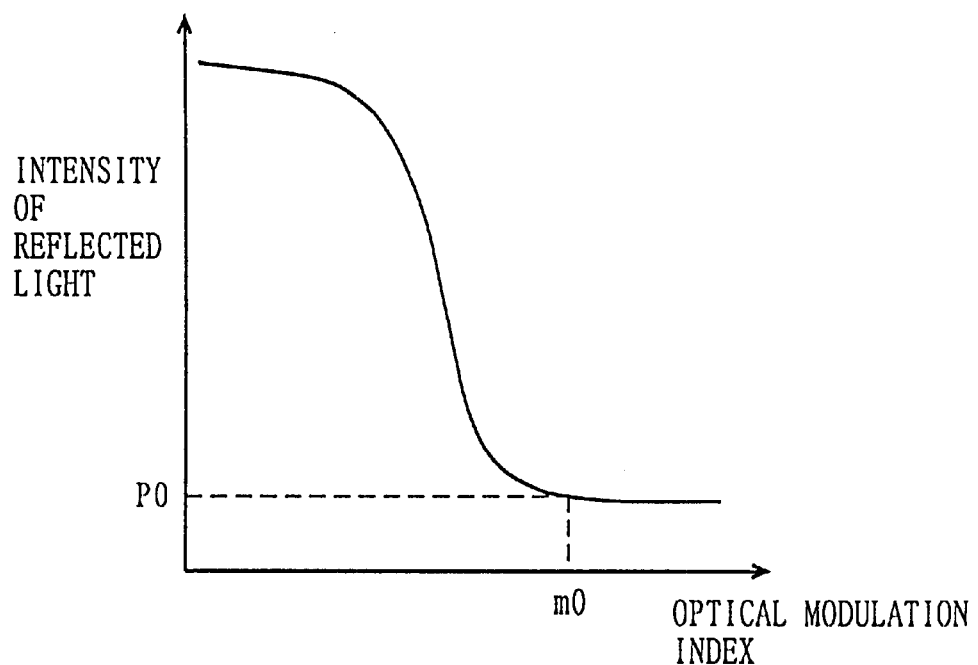
FIG. 7 is a diagram illustrating the relation between the optical modulation index of the pilot signal and the intensity of reflected light.

FIG. 7 is a diagram illustrating the relation between the optical modulation index of the pilot signal and the intensity of the reflected light. As evident from FIG. 7, the larger the optical modulation index of the pilot signal is, the smaller the intensity of the reflected light is, but plateauing at a certain intensity (P0). This relation itself has been disclosed in Japanese Patent Laying-Open No. 9-69814 (1997-69814) (refer to FIG. 3 in the publication). Furthermore, the intensity of the reflected light caused by SBS, and distortion or noise has one-to-one correspondence. Therefore, the reflected light monitoring part 26 may monitor the level of distortion or noise instead of the intensity of the reflected light.

In view of the transmission characteristics, the optical modulation index of the pilot signal is preferably as small as possible. Therefore, an appropriate optical modulation index of the pilot signal is a minimum value for suppressing SBS, such as m0 shown in FIG. 7.

In the above description, each signal included in the input signal has only a carrier component. Each signal, however, may also have a modulation component in addition to a carrier component, or may have only a modulation component (refer to the first embodiment for detail).

As described above, according to the third embodiment, the intermodulation distortion (second order distortion) between each signal included in the input signal and the pilot signal occurs at the center between two consecutive signals on the frequency axis. It is thus easy to cut off the second order distortion, which deteriorates transmission characteristics most among the intermodulation distortion between the input signal and the pilot signal, by a filter. Therefore, the present apparatus can suppress SBS by multiplexing the input signal with the pilot signal, and also can effectively eliminate an adverse effect of such intermodulation distortion. Consequently, an optical signal of large power can be efficiently transmitted with better transmission characteristics through the optical fiber 23. Furthermore, the present apparatus adjusts the level of the pilot signal to an appropriate value for suppressing SBS, more specifically, to a minimum value for suppressing SBS, allowing far better transmission characteristics.

Fourth Embodiment

Figure 8:
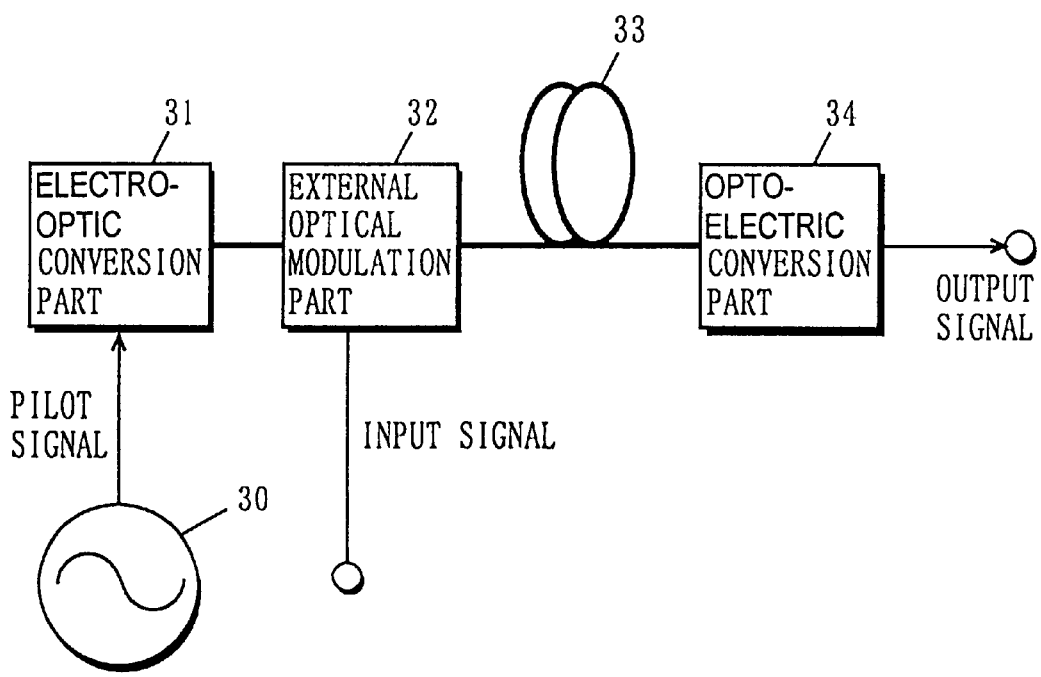
FIG. 8 is a block diagram showing the configuration of an optical transmission apparatus according to the fourth embodiment of the present invention.
Figure 9:
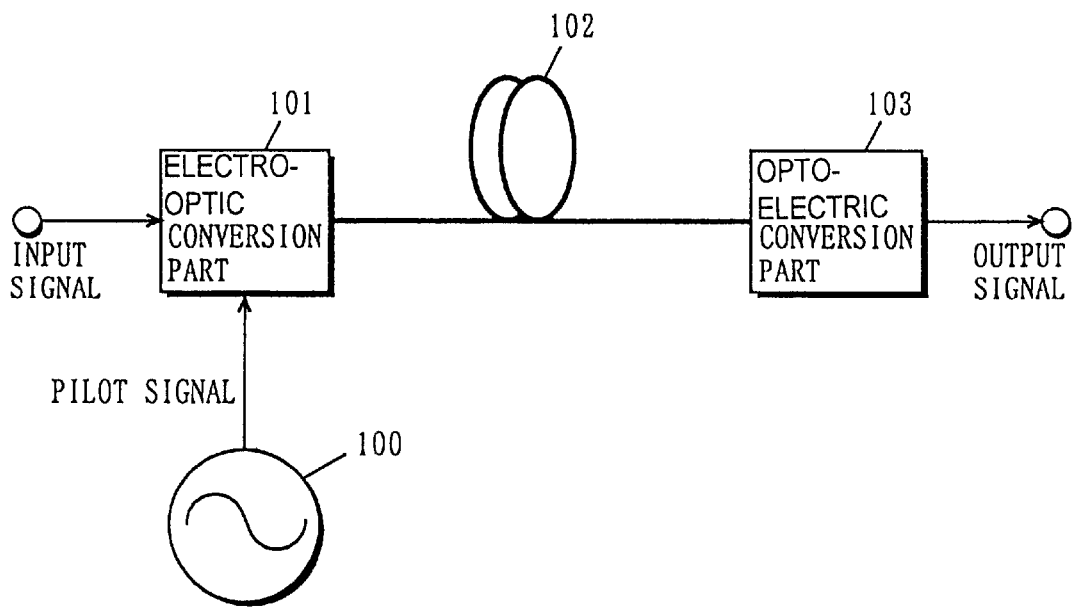
FIG. 9 is a block diagram exemplarily showing a conventional optical transmission apparatus.

FIG. 8 is a block diagram showing the configuration of an optical transmission apparatus according to a fourth embodiment of the present invention. In FIG. 8, the optical transmission apparatus according to the fourth embodiment includes a pilot signal generation part 30, an electro-optic conversion part 31, an external optical modulation part 32, an optical fiber 33, and an opto-electric conversion part 34.

The pilot signal generation part 30 generates a pilot signal. The electro-optic conversion part 31 converts the pilot signal into an optical signal through direct intensity modulation. The external optical modulation part 32 modulates the intensity of the optical signal from the electro-optic conversion part 31 with an input signal (electric signal to be transmitted). The optical fiber 33 guides the optical signal. The opto-electric conversion part 34 converts the optical signal into an electric signal.

Note that, in FIG. 8, an optical amplifying part for amplifying the optical signal may be provided on a transmission path anywhere between the external optical modulation part 32 and the opto-electric conversion part 34 (immediately after the external optical modulation part 32, for example).

The operation of the present optical transmission apparatus is now described. In summary, the present operation is different from that of the first embodiment only in that the optical signal is not converted through direct intensity modulation but is externally modulated with the input signal.

First, the pilot signal generation part 30 generates a pilot signal having a predetermined frequency which will be described later. Then, the pilot signal is fed to the electro-optic conversion part 31. The electro-optic conversion part 31 converts the received pilot signal into an optical signal through direct intensity modulation. The optical signal from the electro-optic conversion part 31 and an input signal are fed to the external optical modulation part 32. Here, the input signal is a frequency-multiplexed signal obtained by multiplexing a plurality of signals whose frequencies are aligned on a frequency axis at regular intervals. The external optical modulation part 32 modulates the intensity of the optical signal from the electro-optic conversion part 31 with the input signal.

The intensity-modulated optical signal outputted from the external optical modulation part 32 propagates through the optical fiber 33 to the opto-electric conversion part 34. The opto-electric conversion part 34 re-converts the received optical signal into an electric signal.

In the above operation, the optical signal obtained by electro-optic conversion through direct intensity modulation is not only intensity-modulated but also frequency-modulated (chirping). In this case, the spectrum of the optical signal is spread over a wide band due to frequency modulation, thereby resulting in reduction in power of the main mode.

The optical transmission apparatus thus suppresses SBS by multiplexing the input signal with the pilot signal.

On the other hand, such multiplexing causes intermodulation distortion between the input signal and the pilot signal. Of the intermodulation distortion, the present optical transmission apparatus further eliminates an adverse effect of second order distortion which deteriorates transmission characteristics most, by setting the frequency of the pilot signal to a specific value.

The frequency of the pilot signal generated by the pilot signal generation part 30 is the same as the first embodiment. That is, with reference to FIGS. 2A to 2C, when the input signal is a frequency-multiplexed signal obtained by multiplexing a plurality of signals aligned on a frequency axis at regular intervals $\Delta f$ ($\Delta f>0$), the frequency of the pilot signal generated by the pilot signal generation part 30 is set to $\{m-(1/2)\}\times\Delta f$ (m is an arbitrary natural number).

This setting causes the intermodulation distortion (second order distortion) between each signal 201 included in the input signal and the pilot signal exactly at the center between two consecutive signals 201 on the frequency axis.

As described above, according to the fourth embodiment, it is thus easy to cut off the second order distortion, which deteriorates transmission characteristics most among the intermodulation distortion between the input signal and the pilot signal, by a filter. Therefore, the present apparatus can suppress SBS by multiplexing the input signal with the pilot signal, and also can effectively eliminate an adverse effect of such intermodulation distortion. Consequently, an optical signal of large power can be transmitted with better transmission characteristics through the optical fiber 33.

Other Embodiments

Other embodiments according to the present invention include the optical transmission apparatuses according to the first to fourth embodiments without the optical fiber (13, 23, 33) and the opto-electric conversion part (14, 24, 34) (refer to FIGS. 1, 6, 8).

While the invention has been described in detail, the foregoing description is in all aspects illustrative and not restrictive. It is understood that numerous other modifications and variations can be devised without departing from the scope of the invention.

What is claimed is:

1. An optical transmission apparatus comprising:
   a pilot signal generator operable to generate a pilot signal; and
   an optical transmitter operable to convert an input signal and the pilot signal into an optical signal, and to transmit the optical signal;
      wherein when the input signal is a frequency-multiplexed signal obtained by multiplexing a plurality of signals aligned on a frequency axis at a regular interval $\Delta f$ said pilot signal generator generates the pilot signal having a frequency $(m-(1/2))\times \Delta f$,
      wherein $\Delta f>0$, and
      wherein m is an arbitrary natural number.

2. The optical transmission apparatus according to claim 1, further comprising:
   an electro-optical converter operable to convert the pilot signal into an optical signal through direct intensity modulation; and
   an external optical modulator operable to intensity-modulate the optical signal outputted from said electro-optical converter with the input signal,
   wherein the input signal is an electrical signal.

3. The optical transmission apparatus according to claim 2, further comprising:
   an optical fiber capable of guiding the optical signal outputted from said external optical modulator; and
   an opto-electric converter operable to convert the optical signal guided by said optical fiber into an electrical signal.

4. The optical transmission apparatus according to claim 1, further comprising:
   a multiplexor operable to multiplex the input signal with the pilot signal; and
   an electro-optic converter operable to convert an electric signal outputted from said multiplexor into an optical signal through direct intensity modulation,
   wherein the input signal is an electrical signal.

5. The optical transmission apparatus according to claim 4, wherein a frequency of each signal included in the input signal is set to $(n-(1/2)+C)\times\Delta f$, and
   wherein n is a positive integer and C is 0 or an arbitrary positive integer.

6. The optical transmission apparatus according to claim 4, further comprising:
   a level adjuster operable to adjust a level of the pilot signal;
   an electro-optic converter operable to convert an electrical signal outputted from said multiplexor into an optical signal through direct intensity modulation;
   a reflected light monitoring part operable to monitor reflected light caused by stimulated Brillouin scattering (SBS) in an optical fiber connected to said electro-optic converter; and
   an optical coupler operable to supply the reflected light propagating through the optical fiber in a reverse direction to the optical signal to said reflected light monitoring part,
      wherein said level adjuster is operable to adjust the level of the pilot signal to a minimum value for suppressing the SBS based on monitoring results of said reflected light monitoring part, and
   wherein said multiplexor is arranged to multiplex the input signal with the level-adjusted pilot signal.

7. The optical transmission apparatus according to claim 6, further comprising:
   an optical coupler operable to supply the reflected light propagating through the optical fiber in a reverse direction to the optical signal to said reflected light monitoring part.

8. The optical transmission apparatus according to claim 4, further comprising:
   an optical fiber capable of guiding the optical signal outputted from said electro-optic converter; and
   an opto-electric converter operable to convert the optical signal guided by said optical fiber into an electrical signal.

9. The optical transmission apparatus according to claim 8, wherein a frequency of each signal included in the input signal is set to $(n-(1/2)+C)\times\Delta f$, and
   wherein n is a positive integer and C is 0 or an arbitrary positive integer.

10. The optical transmission apparatus according to claim 8, further comprising:
    a level adjuster operable to adjust a level of the pilot signal;
    multiplexor operable to multiplex the input signal with the level-adjusted pilot signal;
    a reflected light monitoring part operable to monitor reflected light caused by stimulated Brillouin scattering (SBS) in said optical fiber; and
    an optical coupler capable of supplying the reflected light propagating through said optical fiber in a reverse direction to the optical signal to said reflected light monitoring part,
       wherein said level adjuster is operable to adjust the level of the pilot signal to a minimum value for suppressing the SBS based on monitoring results of said reflected light monitoring part.

11. The optical transmission apparatus according to claim 10, wherein said reflected light monitoring part is operable to monitor the reflected light by measuring an intensity thereof.

12. A device for use with an optical transmitter operable to convert an input signal and a pilot signal into an optical signal and to transmit the optical signal, said device comprising:
    a pilot signal generator operable to generate the pilot signal and provide the pilot signal to the optical transmitter,
       wherein when the input signal is a frequency-multiplexed signal obtained by multiplexing a plurality of signals aligned on a frequency axis at a regular interval $\Delta f$ said pilot signal generator generates the pilot signal having a frequency $(m-(1/2))\times\Delta f$,
    wherein $\Delta f>0$, and
    wherein m is an arbitrary natural number.

13. The device according to claim 12, further comprising:
    an electro-optic conversion part operable to convert the pilot signal into an optical signal through direct intensity modulation; and
    an optical modulation part operable to intensity-modulate the optical signal outputted from said electro-optic conversion part with the input signal,
    wherein the input signal is an electrical signal.

14. The device according to claim 13, further comprising:
    an optical fiber capable of guiding the optical signal outputted from said optical modulation part; and an opto-electric conversion part operable to convert the optical signal guided by said optical fiber into an electrical signal.

15. The device according to claim 12, further comprising:

a multiplex part operable to multiplex the input signal with the pilot signal; and an electro-optic conversion part operable to convert an electric signal outputted from said multiplex part into an optical signal through direct intensity modulation, wherein the input signal is an electrical signal.

16. The device according to claim 15, further comprising:

an optical fiber capable of guiding the optical signal outputted from said electro-optic conversion part; and an opto-electric conversion part operable to convert the optical signal guided by said optical fiber into an electrical signal.

17. The device according to claim 16, wherein a frequency of each signal included in the input signal is set to $(n-(1/2)+C) \times \Delta f$, and wherein n is a positive integer and C is 0 or an arbitrary positive integer.

18. The device according to claim 17, further comprising:

a level adjuster operable to adjust a level of the pilot signal;

multiplex part operable to multiplex the input signal with the level-adjusted pilot signal;

a reflected light monitoring part operable to monitor reflected light caused by stimulated Brillouin scattering (SBS) in said optical fiber; and an optical coupler capable of supplying the reflected light propagating through said optical fiber in a reverse direction to the optical signal to said reflected light monitoring part, wherein said level adjuster is operable to adjust the level of the pilot signal to a minimum value for suppressing the SBS based on monitoring results of said reflected light monitoring part.

19. The device according to claim 18, wherein said reflected light monitoring part is operable to monitor the reflected light by measuring an intensity thereof.

20. The device according to claim 15, wherein a frequency of each signal included in the input signal is set to $(n-(1/2)+C) \times \Delta f$, and wherein n is a positive integer and C is 0 or an arbitrary positive integer.

21. The device according to claim 15, further comprising:

a level adjuster operable to adjust a level of the pilot signal;

an electro-optic conversion part operable to convert an electrical signal outputted from said multiplex part into an optical signal through direct intensity modulation;

a reflected light monitoring part operable to monitor reflected light caused by stimulated Brillouin scattering (SBS) in an optical fiber connected to said electro-optic conversion part; and an optical coupler operable to supply the reflected light propagating through the optical fiber in a reverse direction to the optical signal to said reflected light monitoring part, wherein said level adjuster is operable to adjust the level of the pilot signal to a minimum value for suppressing the SBS based on monitoring results of said reflected light monitoring part, and wherein said multiplex part is arranged to multiplex the input signal with the level-adjusted pilot signal.

22. The device according to claim 21, further comprising:

an optical coupler operable to supply the reflected light propagating through the optical fiber in a reverse direction to the optical signal to said reflected light monitoring part.

* * * * *